(12) United States Patent
Behenna, II

(10) Patent No.: US 10,764,555 B2
(45) Date of Patent: Sep. 1, 2020

(54) 3-DIMENSIONAL PHYSICAL OBJECT DYNAMIC DISPLAY

(71) Applicant: William G. Behenna, II, Rolling Hills Estates, CA (US)

(72) Inventor: William G. Behenna, II, Rolling Hills Estates, CA (US)

( * ) Notice: Subject to any disclaimer, the term of this patent is extended or adjusted under 35 U.S.C. 154(b) by 0 days.

(21) Appl. No.: 16/267,069

(22) Filed: Feb. 4, 2019

(65) Prior Publication Data

US 2019/0246090 A1 Aug. 8, 2019

Related U.S. Application Data

(60) Provisional application No. 62/625,483, filed on Feb. 2, 2018.

(51) Int. Cl.
*H04N 13/122* (2018.01)
*H04N 13/275* (2018.01)
*H04N 13/388* (2018.01)

(52) U.S. Cl.
CPC ......... *H04N 13/122* (2018.05); *H04N 13/275* (2018.05); *H04N 13/388* (2018.05)

(58) Field of Classification Search
CPC ... H04N 13/122; H04N 13/388; H04N 13/275
See application file for complete search history.

(56) References Cited

U.S. PATENT DOCUMENTS

| 3,140,415 A | 7/1964 | Ketchpel | |
|---|---|---|---|
| 3,335,217 A | 8/1967 | Bassett | |
| 4,521,854 A * | 6/1985 | Rhim | H02N 13/00 117/901 |
| 5,196,999 A * | 3/1993 | Abe | C30B 30/08 219/121.36 |
| 5,247,144 A * | 9/1993 | Abe | F27B 17/00 219/648 |
| 6,724,519 B1 * | 4/2004 | Comiskey | G02F 1/167 345/109 |
| 6,885,495 B2 * | 4/2005 | Liang | G02F 1/167 345/107 |
| 9,829,612 B1 * | 11/2017 | Koudsi | G02B 26/0808 |
| 2004/0232826 A1 * | 11/2004 | Liu | H04N 9/3129 313/503 |

(Continued)

OTHER PUBLICATIONS

Single Plate Electrostatic Levitation; https://www.youtube.com/watch?v=aroBnpx6180; dated May 24, 2016.

*Primary Examiner* — Amy Onyekaba
(74) *Attorney, Agent, or Firm* — Fitch, Even, Tabin & Flannery LLP

(57) ABSTRACT

A 3-dimensional physical object dynamic display comprises a plurality of electrically-conductive particle control plates and a plurality of electrically-conductive particles that are loosely disposed over at least some of the plurality of electrically-conductive particle control plates. These particles are each capable of holding an electrostatic charge. The display further comprises a control circuit configured to use the plurality of electrically-conductive particle control plates to selectively position at least some of the plurality of electrically-conductive particles into an aggregated form to thereby dynamically form a 3-dimensional physical object.

19 Claims, 5 Drawing Sheets

(56) References Cited

U.S. PATENT DOCUMENTS

| | | | |
|---|---|---|---|
| 2005/0259068 A1* | 11/2005 | Nihei | G09G 3/3433 345/107 |
| 2007/0120814 A1* | 5/2007 | Moriyama | G02F 1/167 345/107 |
| 2007/0128905 A1* | 6/2007 | Speakman | B82Y 30/00 439/161 |
| 2007/0247595 A1* | 10/2007 | Refai | H04N 13/39 353/94 |
| 2008/0286526 A1* | 11/2008 | Konakahara | G01N 21/3563 428/137 |
| 2009/0179852 A1* | 7/2009 | Refai | H04N 13/39 345/107 |
| 2009/0292206 A1* | 11/2009 | Sato | A61B 8/13 600/443 |
| 2010/0207868 A1* | 8/2010 | Konno | G09G 3/344 345/107 |
| 2010/0321478 A1* | 12/2010 | Sliwa | G03B 21/562 348/51 |
| 2011/0169927 A1* | 7/2011 | Mages | G06F 3/04815 348/51 |
| 2011/0228377 A1* | 9/2011 | Kaga | G02F 1/167 359/296 |
| 2011/0304529 A1* | 12/2011 | Yeo | G02F 1/167 345/107 |
| 2012/0013615 A1* | 1/2012 | Mizokami | H01J 11/40 345/419 |
| 2012/0064228 A1* | 3/2012 | Kitamura | H01J 9/20 427/66 |
| 2013/0007604 A1* | 1/2013 | John | G06F 3/0488 715/255 |
| 2013/0222405 A1* | 8/2013 | Ademar | G06F 3/1423 345/581 |
| 2013/0229327 A1* | 9/2013 | Lee | H04N 13/31 345/58 |
| 2014/0158884 A1* | 6/2014 | Paluszynski | H01J 37/26 250/307 |
| 2014/0185282 A1* | 7/2014 | Hsu | G09F 13/00 362/231 |
| 2014/0198376 A1* | 7/2014 | Chang | G01N 21/658 359/334 |
| 2014/0240314 A1* | 8/2014 | Fukazawa | G06T 15/00 345/419 |
| 2015/0253263 A1* | 9/2015 | Feser | G01N 23/046 378/6 |
| 2016/0149366 A1* | 5/2016 | Akutsu | H01R 43/007 156/302 |
| 2017/0171536 A1* | 6/2017 | Teller | H04N 13/393 |
| 2017/0214909 A1* | 7/2017 | Subrahmanyam | G02B 30/50 |
| 2017/0310956 A1* | 10/2017 | Perdices-Gonzalez | G09G 3/3208 |
| 2018/0180872 A1* | 6/2018 | Hopkins | G02B 26/0841 |
| 2019/0141315 A1* | 5/2019 | Broadbent | G02B 30/50 |

* cited by examiner

3-DIMENSIONAL PHYSICAL OBJECT DYNAMIC DISPLAY

RELATED APPLICATION(S)

This application claims the benefit of U.S. Provisional application No. 62/625,483, filed Feb. 2, 2018, which is incorporated by reference in its entirety herein.

TECHNICAL FIELD

These teachings relate generally to displays.

BACKGROUND

Displays are known in the art. Displays constitute an output device for the presentation of information in visual form. When the input information is supplied as an electrical signal, the display is sometimes called an electronic display. As used herein, "display" will be understood to refer to an electronic display.

Generally speaking, displays present information as two-dimensional content. While satisfactory for many purposes, there are many times when a three-dimensional presentation would be preferred. Many so-called three-dimensional displays generally rely upon optical phenomena to create the appearance of a virtual three-dimensional object. At least one approach employs stacks of arrays of light-emitting devices to create a three-dimensional array of pixels that can be selectively illuminated to form the appearance of an actual three-dimensional object.

Unfortunately, existing approaches to three-dimensional displays do not meet at least some needs in at least some application settings.

BRIEF DESCRIPTION OF THE DRAWINGS

The above needs are at least partially met through provision of the 3-dimensional physical object dynamic display described in the following detailed description, particularly when studied in conjunction with the drawings, wherein.

Figure 1:
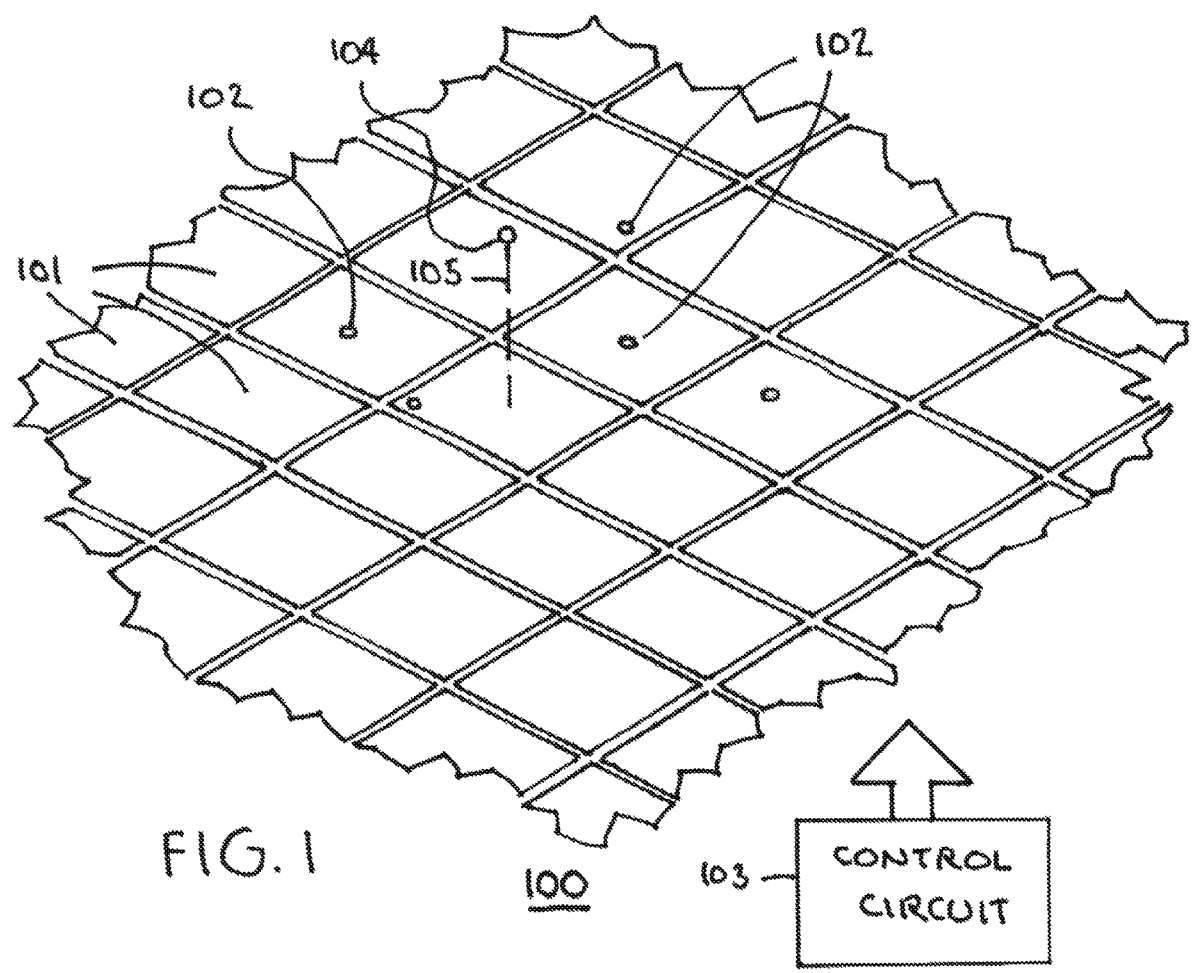
FIG. 1 comprises a perspective schematic block diagram as configured in accordance with various embodiments of these teachings.

Elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present teachings. Also, common but well-understood elements that are useful or necessary in a commercially feasible embodiment are often not depicted in order to facilitate a less obstructed view of these various embodiments of the present teachings. Certain actions and/or steps may be described or depicted in a particular order of occurrence while those skilled in the art will understand that such specificity with respect to sequence is not actually required. The terms and expressions used herein have the ordinary technical meaning as is accorded to such terms and expressions by persons skilled in the technical field as set forth above except where different specific meanings have otherwise been set forth herein. The word "or" when used herein shall be interpreted as having a disjunctive construction rather than a conjunctive construction unless otherwise specifically indicated.

DETAILED DESCRIPTION

Generally speaking, pursuant to these various embodiments a 3-dimensional physical object dynamic display comprises a plurality of electrically-conductive particle control plates and a plurality of electrically-conductive particles that are loosely disposed over at least some of the plurality of electrically-conductive particle control plates. These particles are each capable of holding an electrostatic charge. The display further comprises a control circuit configured to use the plurality of electrically-conductive particle control plates to selectively position at least some of the plurality of electrically-conductive particles into an aggregated form to thereby dynamically form a 3-dimensional physical object.

The electrically-conductive particles can be comprised of any of a variety of materials. By one approach at least some of the electrically-conductive particles are each at least substantially comprised of aluminum.

By one approach, the aforementioned electrically-conductive particle control plates are each electrically insulated from any of the other electrically-conductive particle control plates. By one approach at least a majority of the plurality of electrically-conductive particle control plates are disposed at least substantially planar to one another. In lieu of the foregoing or in combination therewith, and by another approach, at least some of the plurality of electrically-conductive particle control plates are disposed to form a concave structure.

The control circuit may be configured to employ one or more of the electrically-conductive particle control plates to selectively position a given one of the electrically-conductive particles. In a typical application setting, more than one of the plates, such as five of the plates or nine of the plates, may be beneficially used in these regards.

By one approach the control circuit operably couples to a voltage source that operably and individually couples to each of the electrically-conductive particle control plates. The control circuit uses the voltage source to individually control an amount of electrical charge presented by each of the electrically-conductive particle control plates.

By one approach the 3-dimensional physical object dynamic display includes at least one particle locator that also operably couples to the control circuit. The control circuit uses particle location information provided by the particle locator to ascertain a present location of the various particles. By one approach the display includes two or more such particle locators. Various particle location platforms can serve in these regards. By one approach the particle locator comprises an optical image capture apparatus such as a digital camera.

By one approach at least a portion of the display is contained within a transparent airtight case that is disposed about the plurality of electrically-conductive particle control plates and the plurality of electrically-conductive particles to thereby isolate the latter from dust and other contaminants as well as environmental influences such as moving air particles. By one approach the transparent airtight case maintains a partial or complete vacuum. If desired, the display can further include at least one light-emitting source configured to emit light having at least one wavelength selected to strip electrons from the electrically-conductive particles to thereby facilitate maintaining an electrical charge on each of the electrically-conductive particles.

So configured, an object can be rendered as a physical three-dimensional object by selectively positioning the electrically-conductive particles into an aggregated form. The particles may, or may not, be in physical contact with one another when so positioned. To some considerable extent any spacing between the particles comprises a resolution consideration that can be met by appropriately sizing and configuring the plates in a particular array. Regardless of the resultant resolution, the physical aggregation of the particles can be viewed from any of a variety of fields of view, thereby providing the viewer with an extremely convenient, intuitive, and accurate understanding of the object.

A given object can potentially be rendered in a very short period of time. Initial placement of the particles can likely be achieved, for example, in less than one second (depending in part upon such factors as the overall dimensions of the display space). It is anticipated that these teachings can be employed to provide a three-dimensional video display opportunity as well as a still image display opportunity.

These and other benefits may become clearer upon making a thorough review and study of the following detailed description. Referring now to the drawings, and in particular to FIG. 1, an illustrative platform for a 3-dimensional physical object dynamic display 100 that is compatible with many of these teachings will be presented.

In this illustrative example the 3-dimensional physical object dynamic display 100 includes a plurality of electrically-conductive particle control plates 101. In this example the plates 101 are disposed in a coplanar manner with respect to one another. These teachings will accommodate other approaches in these regards as will be described in more detail below.

In this illustrative example the electrically-conductive particle control plates 101 are all formed as squares. These teachings will accommodate other shapes, however. Examples include but are not limited to triangles, hexagons, and any of a variety of nonsymmetrical shapes as desired. Also in this example, all of the plates 101 are essentially identical to one another. These teachings will accommodate other approaches in those regards as desired. By one approach, for example, the plates 101 towards the center area of the display 100 may be relatively smaller in size than the plates 101 that are located towards the outer edge of the display 100.

In this illustrative example the electrically-conductive particle control plates 101 are formed using an electrically conductive material such as, but not limited to, aluminum, copper, gold, and so forth. Each plate 101 can be comprised of only a single element or can be comprised of an alloy or other combination of materials as desired.

In this example the 3-dimensional physical object dynamic display 100 also includes a plurality of electrically-conductive particles 102. These particles 102 are loosely disposed over at least some of the electrically-conductive particle control plates 101. As used herein, "loosely" shall be understood to mean that the particles 102 are not physically connected to any other component or feature of the display 100. Each of these particles 102 is capable of holding an electrostatic charge.

By one approach, each of the particles 102 is at least substantially comprised of aluminum (that is, each particle 102 is comprised by more than 50 percent of aluminum) up to and including pure aluminum. Other materials can of course be employed as desired.

In a typical application setting these particles 102 can be identical or nearly identical to one another. For example, at least 90 percent of the particles 102 may be within 1, 2, or 5 percent of one another with respect to both size and weight.

So configured, the display 100 comprises an array of plates 101 that can be electrically charged and where the particles 102 can be electrically charged as well. When properly charged, the particles 102 can be suspended above the plates 101 by electrostatic repulsion. Being electrically isolated from one another, each plate 101 can be both variably and independently charged. Accordingly, the force exerted on each particle 102 can be varied and hence manipulated by appropriate control of the plates 101.

Taking Earnshaw's theorem into consideration, the array of charged plates 101 should have an actively changing charge to maintain the desired position of the particles 102. A computing device can serve to actively calculate the necessary superposition of forces on each particle 102 to move and/or maintain the position thereof.

Accordingly, to serve in those regards, the display 100 also includes a control circuit 103. Such a control circuit must be able to execute mathematical operations in a fashion that enables operation of the display 100. The control circuit must also have a direct or indirect interface to the aforementioned voltage source to facilitate modulation of the voltage of the particle control plates 101. Being a "circuit," the control circuit 103 comprises structure that includes at least one (and typically many) electrically-conductive paths (such as paths comprised of a conductive metal such as copper or silver) that convey electricity in an ordered manner, which path(s) will also typically include corresponding electrical components (both passive (such as resistors and capacitors) and active (such as any of a variety of semiconductor-based devices) as appropriate) to permit the circuit to effect the control aspect of these teachings.

Such a control circuit 103 can comprise a fixed-purpose hard-wired hardware platform (including but not limited to an application-specific integrated circuit (ASIC) (which is an integrated circuit that is customized by design for a particular use, rather than intended for general-purpose use), a field-programmable gate array (FPGA), and the like) or can comprise a partially or wholly-programmable hardware platform (including but not limited to microcontrollers, microprocessors, and the like). These architectural options for such structures are well known and understood in the art and require no further description here. This control circuit 103 is configured (for example, by using corresponding programming as will be well understood by those skilled in the art) to carry out one or more of the steps, actions, and/or functions described herein.

By one optional approach the control circuit 103 includes a memory. In addition to retaining information that specifies and characterizes the object to be rendered by the display 100, this memory can serve, for example, to non-transitorily store the computer instructions that, when executed by the control circuit 103, cause the control circuit 103 to behave as described herein. (As used herein, this reference to "non-transitorily" will be understood to refer to a nonephemeral state for the stored contents (and hence excludes when the stored contents merely constitute signals or waves) rather than volatility of the storage media itself and hence includes both non-volatile memory (such as read-only memory (ROM) as well as volatile memory (such as a dynamic random access memory (DRAM).)

Generally speaking, this control circuit 103 is configured to use the plurality of electrically-conductive particle control plates 101 to selectively position at least some of the plurality of electrically-conductive particles 102 into an aggregated form to thereby dynamically form a 3-dimensional physical object. (As used herein the expression "configured to" denotes an actual physical state of configuration that is fundamentally tied to the physical characteristics of the feature that precede the phrase "configured to.") As one very simple example in these regards, FIG. 1 depicts a particular one of the electrically-conductive particles (denoted by reference numeral 104) that is positioned at a particular height (represented by a line denoted by reference numeral 105) above the corresponding plate 103.

Numerous other enabling and optional details will now be described.

Figure 2:
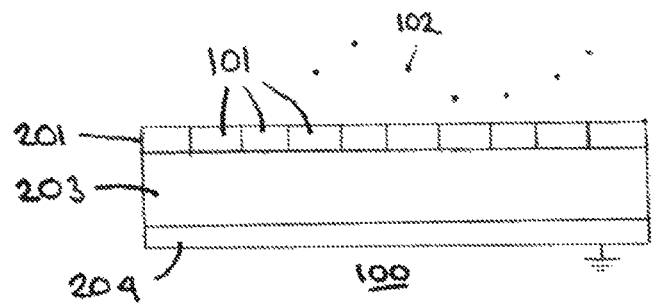
FIG. 2 comprises a side elevational schematic view as configured in accordance with various embodiments of these teachings.
Figure 3:
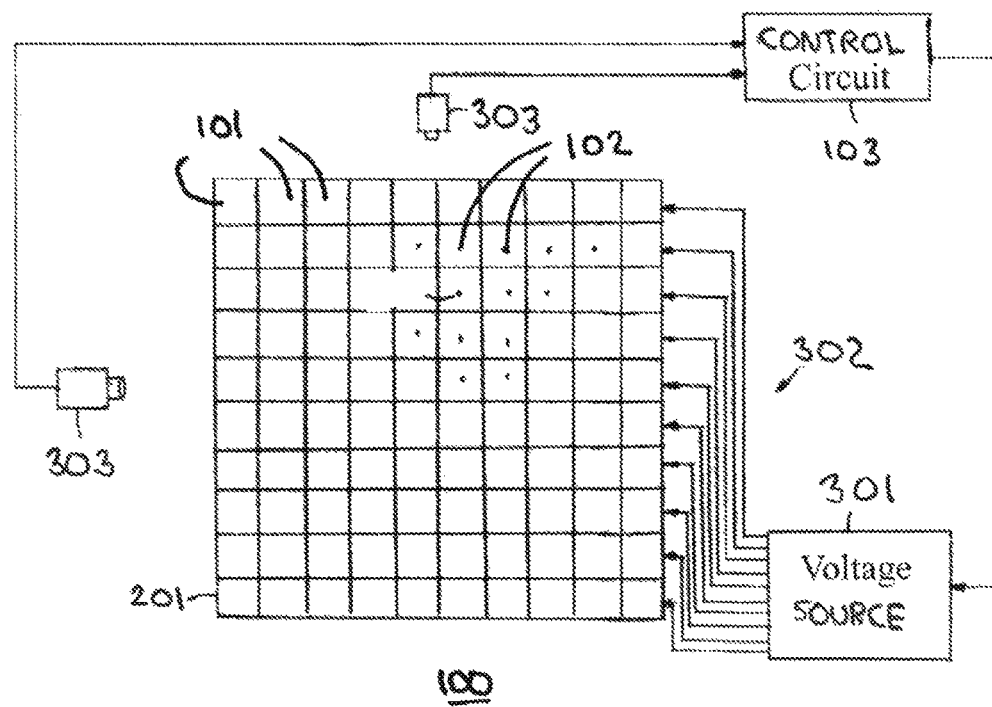
FIG. 3 comprises a top plan schematic view as configured in accordance with various embodiments of these teachings.
Figure 4:
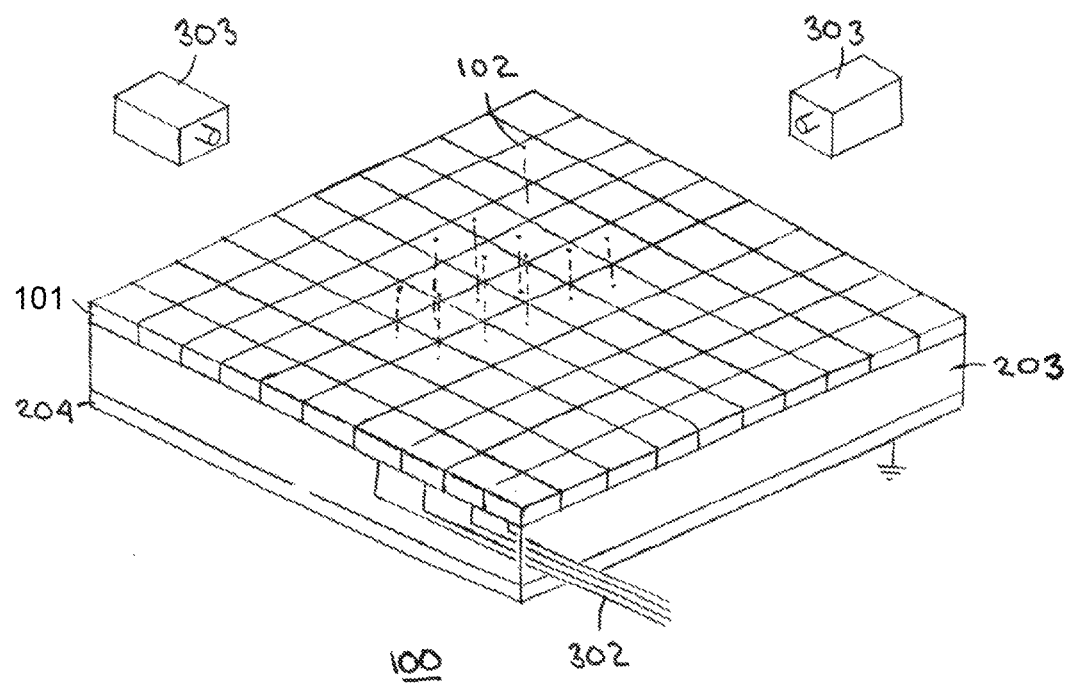
FIG. 4 comprises a perspective schematic view as configured in accordance with various embodiments of these teachings.

Referring now to FIGS. 2-4, a particular illustrative example will be provided. It should be understood that the details of this example are intended to serve an illustrative purpose. Accordingly, the specific details of this example should not be taken as limitations regarding the scope of these teachings. It should also be understood that this example is necessarily a simple one for the sake of clarity and brevity. In a practical application setting, many of the details of this example could be scaled accordingly.

In this example, the display 100 comprises an array 201 of the aforementioned electrically-conductive particle control plates 101. In this example the plates 101 are comprised of aluminum and are shaped as squares. The array 201 itself comprises a 10×10 array of these plates 101. As described above, each of these plates 101 is electrically insulated from any of the other plates 101. In this example all of the electrically-conductive particle control plates 101 lie in a single plane with respect to one another.

Also in this example, each of the plates 101 has a dielectric coating formed on the bottom thereof. This dielectric coating may be formed on only a portion of the bottom of each plate 101 or maybe fully coextensive with that underside as desired.

In this example the aforementioned array 201 lies on the surface of an electrolytic solution 203. This solution 203 can be retained within a container of choice (not shown). The bottom of that container comprises a single aluminum plate 204 that is in contact with the electrolytic solution 203. That aluminum plate 204 is grounded. So configured, an electric charge can flow through the electrolytic solution 203 to accumulate on the aforementioned dielectric coating on the bottom of the desired plate 101 in the aforementioned array 201.

The display 100 also includes a plurality of electrically-conductive particles 102. In this example the particles 102 each comprise a small grain of aluminum. Initially, the particles 102 lie in contact with the plates 101 and hence are identically charged with the plates 101. Being an identical charge, the electrostatic force on each particle 102 will levitate the particle 102 above its respective plate 101.

The distance that the particle 102 moves will be a function, in part, of the strength of the charge on one or more of the plates 101. To facilitate the foregoing, in this example the display 100 includes a voltage source 301 that operably couples to the control circuit 103 and operably and individually to each of the electrically-conductive particle control plates 101 via a corresponding plurality of electrically conductive leads 302. (For the sake of clarity, leads 302 are only shown in FIG. 3 for a first column of the plates 101.) So configured, the control circuit 103 can control the voltage source 301 to individually control an amount of electrical charge presented by each of the electrically-conductive particle control plates 101.

In this illustrative example the display 100 also includes at least one particle locator 303 that also operably couples to the control circuit 103. More specifically, this illustrative example includes two particle locators 303 that are positioned to have fields of view that are orthogonal to one another. Additional particle locators 303 can be included as desired. In this example the particle locators 303 are optical image capture apparatuses such as digital cameras. Other technologies to locate particles 102 (such as ultrasonic-based locators or laser-based locators) can be used in lieu of the foregoing or in combination therewith. These particle locators 303 provide particle location information to the control circuit 103 regarding the location of all particles 102 within their corresponding fields of view. The control circuit 103 can utilize the position information provided by the particle locators 303 when calculating an appropriate charge on each of the plates 101 in order to cause particular particles 102 to remain in a same position or to move to a next desired position.

When there are many charged particles 102 in a concentrated area, the inherent repulsion between these identically-charged particles 102 can introduce an additional dynamic component. To help address such a circumstance at least some of the plates 101 can be arranged in a manner different than that described above. For example, and referring now to FIGS. 5 and 6, the electrically-conductive particle control plates 101 can be disposed to form a concave structure. In particular, and by one approach, the plates 101 can be arranged in concentric rings around a central point and angled upwardly towards the center with an increasing degree of tilt the farther out the plates 101 are from the center to thereby create a corresponding bowl.

Figure 5:
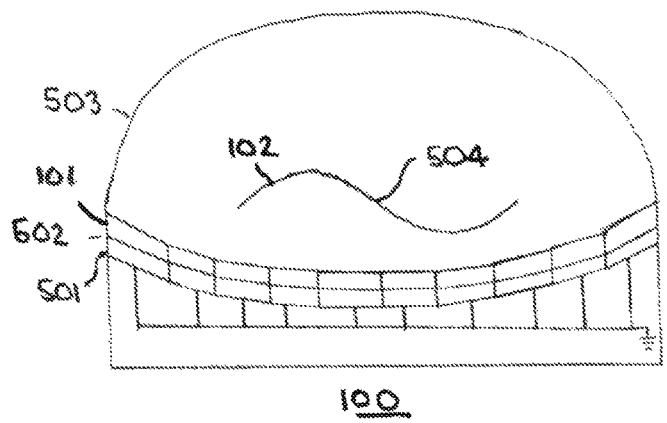
FIG. 5 comprises a side elevational schematic view as configured in accordance with various embodiments of these teachings.

By one approach, and as shown in FIG. 5, each of the above-described plates 101 can serve as a top plate for a capacitor. More particularly, each such top plate can have a corresponding electrically-conductive bottom plate 501 and a dielectric 502 disposed between each top plate and bottom plate to thereby form a resultant capacitor. In such a configuration, the aforementioned voltage source 301 can be individually coupled to each of the top plates while the bottom plates 501 are coupled to ground. This configuration avoids using any dielectric fluids.

With particular reference to FIG. 5, by one approach a transparent airtight case 503 can be disposed about the electrically-conductive particle control plates 101 and the plurality of electrically-conductive particles 102. Such an approach will limit the number of dust particles that may interfere with the operation of the display 100. By one approach this case 503 is evacuated of air. So configured the displayed object 504 is presented within the transparent airtight case 503.

Figure 6:
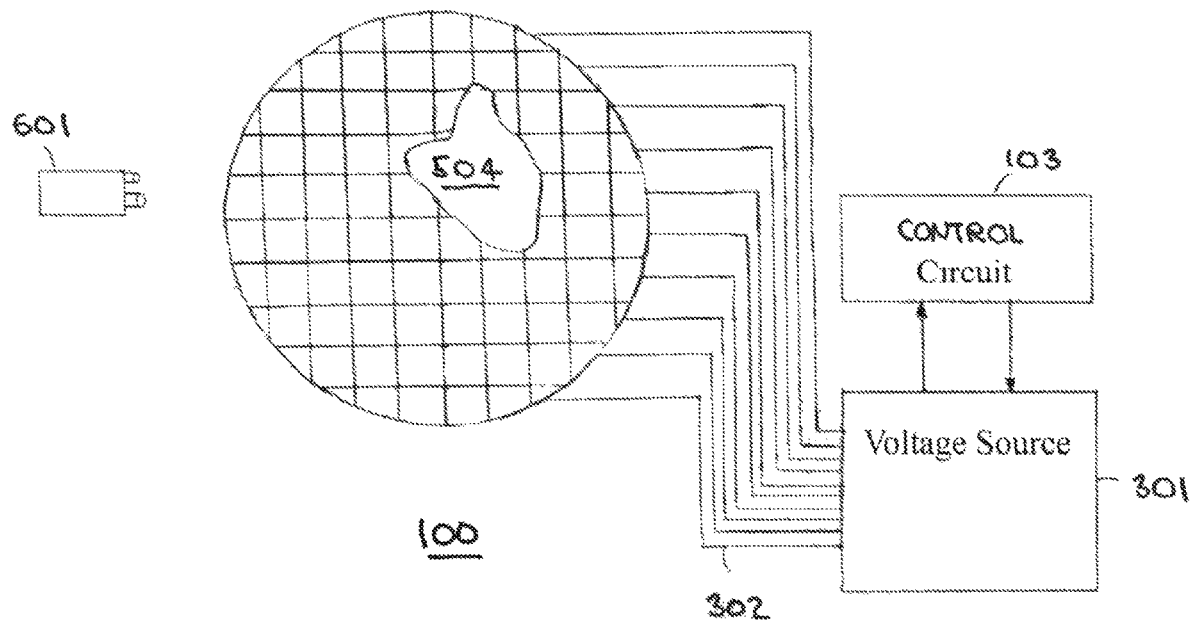
FIG. 6 comprises a top plan schematic view as configured in accordance with various embodiments of these teachings.

With particular reference now to FIG. 6, by one approach the display 100 can further include at least one light-emitting source 601 configured to emit light having at least one wavelength selected to strip electrons from the electrically-conductive particles 102 via the photoelectric effect to thereby facilitate maintaining an electrical charge on each of the electrically-conductive particles 102. Using the photoelectric effect to strip electrons from the particles 102 will typically require the top plates in the above-described configuration to have a positive charge. The resultant positively-charged particles 102 would be repelled from these plates and the free electrons would be collected by the positively-charged plates closest to the particles 102.

Figure 7:
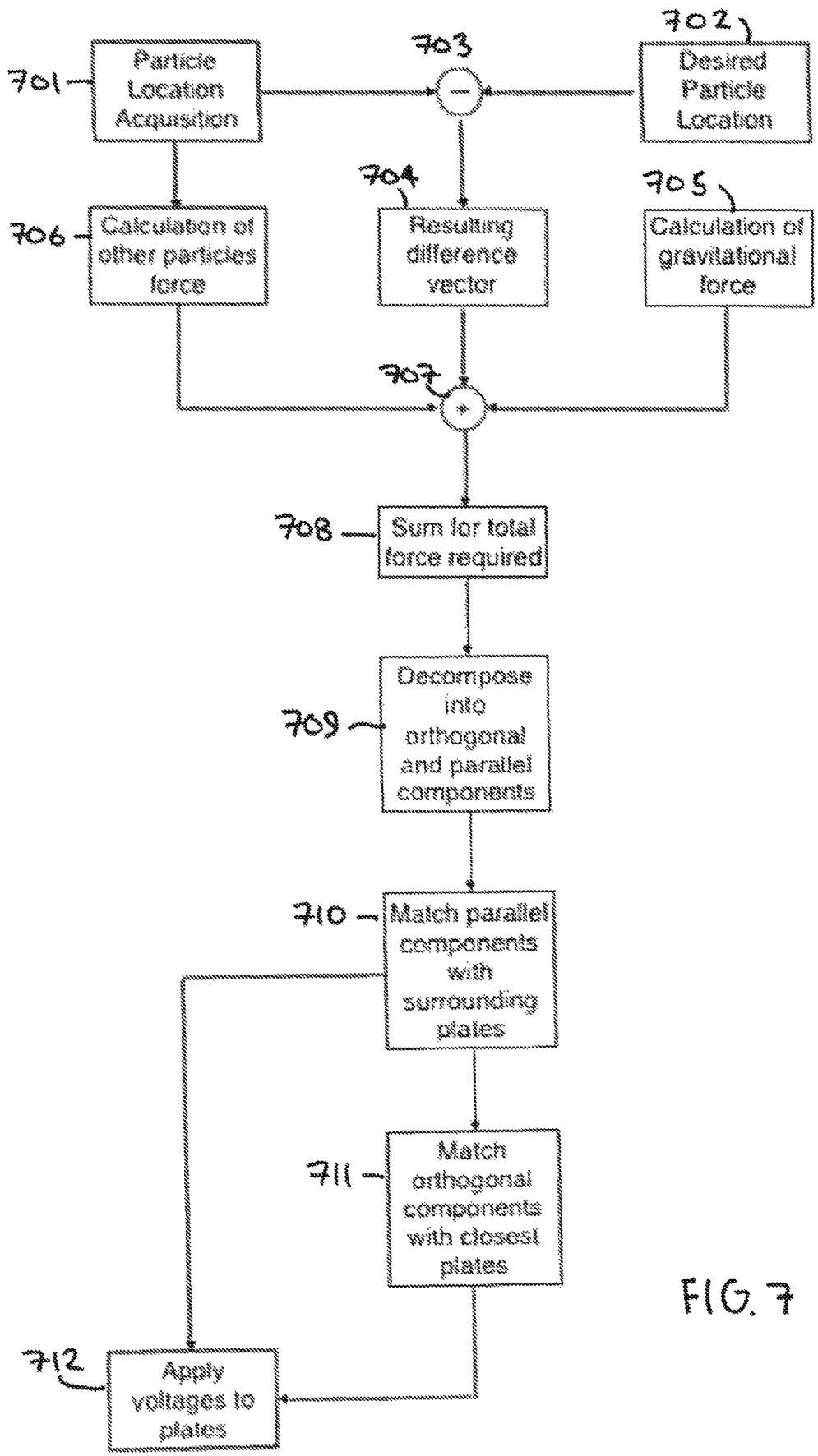
FIG. 7 comprises a flow diagram as configured in accordance with various embodiments of the invention.

Referring now to FIG. 7, an approach to using one or more of the foregoing teachings to precisely position the foregoing particles 102 will be described. It will be presumed for the purposes of this description that the described activities are carried out, directly or indirectly, by the aforementioned control circuit 103.

To maintain a particle in a given location the control circuit 103 has information regarding where all the particles 102 are, their charge $q_{particle}$, and their mass m. At block 701 the control circuit 103 can acquire particle location information from the aforementioned particle locators 303. Desired particle location information 702, in turn, can be obtained, for example, from the aforementioned memory.

Treating the space where an image is rendered as Euclidean space, an origin is designated. From this reference location position vectors $\vec{S}_{cur}$ are the vectors to the current locations of each of the particles. Once the particles' current locations are known they can be compared with the desired locations $\vec{S}_{des}$ at block 703. The resultant displacement vectors can be calculated at block 704 from the difference in the current and desired vectors as $$\vec{S}_{diff} = \vec{S}_{des} - \vec{S}_{cur}$$

from their current locations to the desired locations.

Next, the forces felt by each particle 102 without the charged plates 101 can be calculated. The gravitational force each particle 102 will experience is determined at block 705 as $$\vec{F}_{grav} = m\vec{a}$$

where $\vec{a}$ is the acceleration due to gravity.

Next, the force each particle 102 will experience from the particles 102 surrounding it can be approximated at block 706 by defining a volume of significance around a target particle 102, which reduces the number of calculations that need to be executed. Once n number of particles 102 in the volume of significance are identified the force on the target particle 102 is given by $$\vec{F}_{sur} = k_e \cdot q_{particle} \sum_{n=1}^{m} \frac{q_n}{|r_n|^2} \hat{r}_n$$

where $k_e$ is Coulomb's constant, $q_n$ is the charge of the nth surrounding particle 102 and $r_n$ is the vector from the nth surrounding particle 102 to the target particle 102.

Once these two forces are known they can be combined at blocks 707 and 708 to find the inherent force on the particle 102:

$$\vec{F}_{in} = \vec{F}_{sur} + \vec{F}_{grav}.$$

The plates 101 must provide a force equal in magnitude and opposite in direction to this combined force to maintain the particle's location and then also provide a force in the same direction as $\vec{S}_{diff}$. The force in the direction of $\vec{S}_{diff}$ can be arbitrarily large or small given by $$\vec{F}_{diff} = k \cdot \vec{S}_{diff}$$

where k is an arbitrary scalar. Combining these two we get the total desired force on the particle 102

$$\vec{F}_{tot} = \vec{F}_{diff} - \vec{F}_{in}$$

To determine the voltage supplied to each of the plates 101 the corresponding capacitance should be known so that the charge on the plate 101 can be determined by $$q_{plate} = C_{plate} \cdot V$$

In this example, the plates 101 that get charge are the five plates 101 closest to the target particle 102 organized in a plus footprint. These plates 101 can exert a force on the particle 102 in any direction based on the charge they carry. At block 709 the force component is decomposed into its three dimensional components, such that the two components parallel to the plates can be controlled by the outer plates. The plate on the opposite side from the direction of each parallel component of $\vec{F}_{tot}$ charge to create a repulsive force on the particle proportional to the magnitude of the force component. The voltage supplied to the outer plates is given by $$V = \frac{1}{k_e} \frac{r^2 F_{tot,x}}{C_{plate} q_{particle} \cos\theta}$$

with θ being the angle between the plane of the plate and the line passing from the particle to the center of the plate. The equation also assumes the plate acts like a point charge on the particle. Once the two parallel components of $F_{tot}$ have been satisfied the perpendicular component of the $F_{tot}$ can be satisfied by the plate closest to the particle. The voltage on this plate will be dictated by the difference in $F_{tot}$ and the perpendicular components of the outer plates. This will be given by $$V = \frac{1}{k_e} \frac{r^2 [F_{tot,z} - (F_{tot,x} \sin\theta + F_{tot,y} \sin\phi)]}{C_{plate} q_{particle}}$$

where θ and φ are the angles between the plane of the respective plates and the particle.

Based upon the foregoing, at block 710 the control circuit matches parallel components with the appropriate surrounding plates and at block 711 matches the orthogonal components with the closest plate or plates. At block 712 the control circuit 103 then facilitates application of the appropriate voltages to the plates 101.

By one approach, and to minimize interaction with adjacent particles that create undesirable forces, the calculation of $\vec{F}_{sur}$ can include the surrounding plate's pervious values, if they are within the volume of significance.

By one approach the foregoing calculations are computed at a high frequency to help ensure accurate use of previous values. The appropriate frequency can depend on the velocity of the particles 102 and how frequently the desired position is changed.

So configured, a genuinely 3-dimensional physical object can be displayed. Such a display can serve a variety of useful purposes. As one simple example, a 3-dimensional object can first be displayed via these teachings to permit real-world visual inspection thereof prior to printing this object using a 3-D printer.

These teachings will accommodate various modifications and/or alternative approaches. By one approach, for example, one or more light projectors can be employed to project colored light onto the resultant aggregated particles.

By another approach, and as another example, these teachings could employ a visible gas that can hold an electrical charge in lieu of the above-described particles 102. These teachings can be employed to manipulate the constituent particles of the gas in the same general way to form the desired displayed object. And as yet another example, instead of using optical image capture devices these teachings will accommodate determining the location of the particles 102 based upon the difference between the charge that has accumulated between the top plate and the bottom plate in the embodiment described in FIG. 5.

Accordingly, those skilled in the art will recognize that a wide variety of modifications, alterations, and combinations can be made with respect to the above described embodiments without departing from the scope of the invention, and that such modifications, alterations, and combinations are to be viewed as being within the ambit of the inventive concept.

What is claimed is:

1. A 3-dimensional physical object dynamic display comprising:
    a plurality of electrically-conductive particle control plates;
    a plurality of electrically-conductive particles that are loosely disposed over at least some of the plurality of electrically-conductive particle control plates and that are each capable of holding an electrostatic charge;
    a control circuit configured to use the plurality of electrically-conductive particle control plates to selectively position at least some of the plurality of electrically-conductive particles into an aggregated form to thereby dynamically form a 3-dimensional physical object.

2. The 3-dimensional physical object dynamic display of claim 1 wherein the electrically-conductive particles are each at least substantially comprised of aluminum.

3. The 3-dimensional physical object dynamic display of claim 1 wherein each of the electrically-conductive particle control plates is electrically insulated from any of the other electrically-conductive particle control plates.

4. The 3-dimensional physical object dynamic display of claim 1 wherein at least a majority of the plurality of electrically-conductive particle control plates are disposed at least substantially planar to one another.

5. The 3-dimensional physical object dynamic display of claim 1 wherein at least a majority of the plurality of electrically-conductive particle control plates are disposed to form a concave structure.

6. The 3-dimensional physical object dynamic display of claim 1 further comprising:
    a voltage source individually coupled to each of the electrically-conductive particle control plates;
    wherein the control circuit couples to the voltage source and wherein the control circuit is configured to use the voltage source to individually control an amount of electrical charge presented by each of the electrically-conductive particle control plates.

7. The 3-dimensional physical object dynamic display of claim 1 further comprising:
    at least one particle locator that is coupled to the control circuit;
    wherein the control circuit is further configured to use particle location information provided by the at least one particle locator when selectively positioning at least some of the plurality of electrically-conductive particles into the aggregated form.

8. The 3-dimensional physical object dynamic display of claim 7 wherein the at least one particle locator comprises a plurality of particle locators.

9. The 3-dimensional physical object dynamic display of claim 7 wherein the at least one particle locator comprises an optical image capture apparatus.

10. The 3-dimensional physical object dynamic display of claim 1 further comprising:
    a transparent airtight case disposed about the plurality of electrically-conductive particle control plates and the plurality of electrically-conductive particles.

11. The 3-dimensional physical object dynamic display of claim 10 further comprising:
    at least one light-emitting source configured to emit light having at least one wavelength selected to strip electrons from the electrically-conductive particles to thereby facilitate maintaining an electrical charge on each of the electrically-conductive particles.

12. The 3-dimensional physical object dynamic display of claim 1 wherein the control circuit is configured to employ at least five of the electrically-conductive particle control plates when selectively positioning a single one of the electrically-conductive particles.

13. The 3-dimensional physical object dynamic display of claim 12 wherein the control circuit is configured to employ the at least five of the electrically-conductive particle control plates when selectively positioning the single one of the electrically-conductive particles by, at least in part: determine a present location of the single one of the electrically-conductive particles; determine a desired location of the single one of the electrically-conductive particles; utilize the present location and the desired location to determine a resultant difference vector; utilize the resultant difference vector to determine a total force required to move the single one of the electrically-conductive particles from the present location to the desired location.

14. The 3-dimensional physical object dynamic display of claim 13 wherein the control circuit is further configured to employ the at least five of the electrically-conductive particle control plates when selectively positioning the single one of the electrically-conductive particles by, at least in part:
    determine, at least in part, any forces imposed on the single one of the electrically-conductive particles by others of the electrically-conductive particles;
    utilize the forces imposed on the single one of the electrically-conductive particles by others of the electrically-conductive particles when determining the total force required to move the single one of the electrically-conductive particles from the present location to the desired location.

15. The 3-dimensional physical object dynamic display of claim 14 wherein the control circuit is further configured to employ the at least five of the electrically-conductive particle control plates when selectively positioning the single one of the electrically-conductive particles by, at least in part:
    determine any gravitational force imposed on the single one of the electrically-conductive particles;
    utilize the gravitational force imposed on the single one of the electrically-conductive particles when determining the total force required to move the single one of the electrically-conductive particles from the present location to the desired location.

16. The 3-dimensional physical object dynamic display of claim 15 wherein the control circuit is further configured to employ the at least five of the electrically-conductive particle control plates when selectively positioning the single one of the electrically-conductive particles by, at least in part:

decompose the total force into both orthogonal and parallel components.

17. The 3-dimensional physical object dynamic display of claim 16 wherein the control circuit is further configured to employ the at least five of the electrically-conductive particle control plates when selectively positioning the single one of the electrically-conductive particles by, at least in part:

match at least one orthogonal component of the total force with at least one of the electrically-conductive particle control plates that is closest to the single one of the electrically-conductive particles.

18. The 3-dimensional physical object dynamic display of claim 17 wherein the control circuit is further configured to employ the at least five of the electrically-conductive particle control plates when selectively positioning the single one of the electrically-conductive particles by, at least in part:

match parallel components of the total force with at least two of the electrically-conductive particle control plates that are disposed about the electrically-conductive particle control plate that is closest to the single one of the electrically-conductive particles.

19. The 3-dimensional physical object dynamic display of claim 18 wherein the control circuit is further configured to employ the at least five of the electrically-conductive particle control plates when selectively positioning the single one of the electrically-conductive particles by, at least in part:

apply selective amounts of voltage to the matched electrically-conductive particle control plates to thereby move the single one of the electrically-conductive particles from the present location to the desired location.

* * * * *